(12) United States Patent
Tonno et al.

(10) Patent No.: US 7,908,072 B2
(45) Date of Patent: Mar. 15, 2011

(54) SYSTEMS AND METHODS FOR USING A COMBUSTION DYNAMICS TUNING ALGORITHM WITH A MULTI-CAN COMBUSTOR

(75) Inventors: Giovanni Tonno, Florence (IT);
Mariateresa Paci, Florence (IT); Jesse Floyd Stewart, Taylors, SC (US);
Antonio Asti, Padua (IT)

(73) Assignee: General Electric Company, Schenectady, NY (US)

( * ) Notice: Subject to any disclaimer, the term of this patent is extended or adjusted under 35 U.S.C. 154(b) by 810 days.

(21) Appl. No.: 11/768,771

(22) Filed: Jun. 26, 2007

(65) Prior Publication Data

US 2009/0005952 A1 Jan. 1, 2009

(51) Int. Cl.
*G06F 19/00* (2006.01)
(52) U.S. Cl. ............................. 701/100; 700/30; 477/30
(58) Field of Classification Search .................. 701/100; 60/772; 477/30; 700/30
See application file for complete search history.

(56) References Cited

U.S. PATENT DOCUMENTS

| 6,823,253 | B2 | 11/2004 | Brunell |
| 6,823,675 | B2 | 11/2004 | Brunell et al. |
| 7,503,177 | B2 * | 3/2009 | Bland et al. ............... 60/772 |
| 7,584,617 | B2 * | 9/2009 | Bland et al. ............... 60/779 |
| 7,620,461 | B2 * | 11/2009 | Frederick et al. ........... 700/30 |
| 2004/0211187 | A1 * | 10/2004 | Catharine et al. ........... 60/772 |
| 2005/0193739 | A1 * | 9/2005 | Brunell et al. ............. 60/772 |
| 2006/0248893 | A1 * | 11/2006 | Mick et al. ............... 60/772 |
| 2007/0062196 | A1 * | 3/2007 | Gleeson et al. ............. 60/722 |
| 2007/0214796 | A1 * | 9/2007 | Bland et al. ............... 60/772 |
| 2009/0005952 | A1 | 1/2009 | Tonno et al. |

* cited by examiner

*Primary Examiner* — Mark Hellner
*Assistant Examiner* — Helal A Algahaim
(74) *Attorney, Agent, or Firm* — Sutherland Asbill & Brennan LLP

(57) ABSTRACT

Embodiments of the invention can provide systems and methods for using a combustion dynamics tuning algorithm with a multi-can combustor. According to one embodiment of the invention, a method for controlling a gas turbine engine with an engine model can be implemented for an engine comprising multiple cans. The method can include obtaining operating frequency information associated with multiple cans of the engine. In addition, the method can include determining variation between operating frequency information of at least two cans. Furthermore, the method can include determining a median value based at least in part on the variation. Moreover, the method can include determining whether the median value exceeds at least one operating threshold. The method can also include implementing at least one engine control action to modify at least one of the operating frequencies if at least one operating threshold is exceeded.

6 Claims, 10 Drawing Sheets

SYSTEMS AND METHODS FOR USING A COMBUSTION DYNAMICS TUNING ALGORITHM WITH A MULTI-CAN COMBUSTOR

FIELD OF THE INVENTION

The invention relates to combustion dynamics control, and more particularly, to systems and methods for using a combustion dynamics tuning algorithm with a multi-can combustor.

BACKGROUND OF THE INVENTION

Design and operation of a combustion system in a rotary machine such as a gas turbine engine can be complex. To operate such engines, conventional combustion dynamics tuning algorithms can utilize one or more sensors associated with various engine components to obtain performance and operating characteristics of the engine. For example, a General Electric Model GE-10 single can combustor can utilize outputs from multiple combustion dynamic sensors to tune the combustor using a conventional dynamics tuning algorithm. In another example, a can annular-type combustor, which can include multiple cans arranged in an annular-shaped configuration, can utilize inputs from multiple combustion dynamic sensors, one for each can, to tune the combustor using another conventional dynamics tuning algorithm. To account for can-to-can variations, the latter type of dynamics tuning algorithm may check whether each of the sensors are within a predefined range, and then the sensors can be set to a median performance value, or alternatively, outputs from all of the sensors can be averaged to determine a dynamics signal to take action on.

In some instances, one or more sensors associated with a combustor, such as a single can combustor or can annular-type combustor, may provide poor or errant data or measurements. For example, a sensor may fail during combustor operation, and data from the sensor may cease or otherwise be considered errant or poor. If more than one sensor provides poor or errant data or measurements, such data or measurements may be input to the conventional dynamics tuning algorithm, and decreased efficiency of the combustor can result. In other instances, poor tuning or decreased efficiency can result in excessive vibration in or damage to the combustor.

Thus, there is a need for systems and methods for using a combustion dynamics tuning algorithm with a multi-can combustor.

BRIEF DESCRIPTION OF THE INVENTION

Embodiments of the invention can address some or all of the needs described above. Embodiments of the invention are directed generally to systems and methods for using a combustion dynamics tuning algorithm with a multi-can combustor. According to one embodiment of the invention, a method for controlling a gas turbine engine with an engine model can be implemented for an engine comprising multiple cans. The method can include obtaining operating frequency information associated with multiple cans of the engine. In addition, the method can include determining variation between operating frequency information of at least two cans. Furthermore, the method can include determining a median value based at least in part on the variation. Moreover, the method can include determining whether the median value exceeds at least one operating threshold. The method can also include implementing at least one engine control action to modify at least one of the operating frequencies if at least one operating threshold is exceeded.

According to another embodiment of the invention, a system for controlling a gas turbine engine can be implemented. The system can include a plurality of sensors adapted to obtain operating frequency information associated with a respective can. The system can also include a controller adapted to determine the variation between operating frequency information of at least two cans based at least in part on the operating frequency information. Moreover, the controller can be adapted to determine a median value based at least in part on the variation. In addition, the controller can be adapted to implement at least one engine control action to modify at least one operating frequency if at least one operating threshold is exceeded.

According to another embodiment of the invention, a model-based control system for controlling a gas turbine engine with multiple cans can be implemented. The system can include a plurality of sensors adapted to obtain operating frequency information associated with a respective can. Furthermore, the system can include a model adapted to receive information from the plurality of sensors. The model can be adapted to determine a variation between operating frequency information of at least two cans. Furthermore, the model can be adapted to determine a median value based at least in part on the variation. In addition, the model can be adapted to determine an output based at least in part on the median value. Moreover, the model can be adapted to determine whether the median value exceeds an at least one operating threshold. In addition, the model can be adapted to determine an output adapted to modify at least one of the operating frequencies. Moreover, the system can include a controller adapted to determine an engine control action based at least in part on the output from the engine model, and further adapted to output a control command to implement the engine control action.

Other embodiments and aspects of embodiments of the invention will become apparent from the following description taken in conjunction with the accompanying drawings.

BRIEF DESCRIPTION OF THE DRAWINGS

Figure 1:
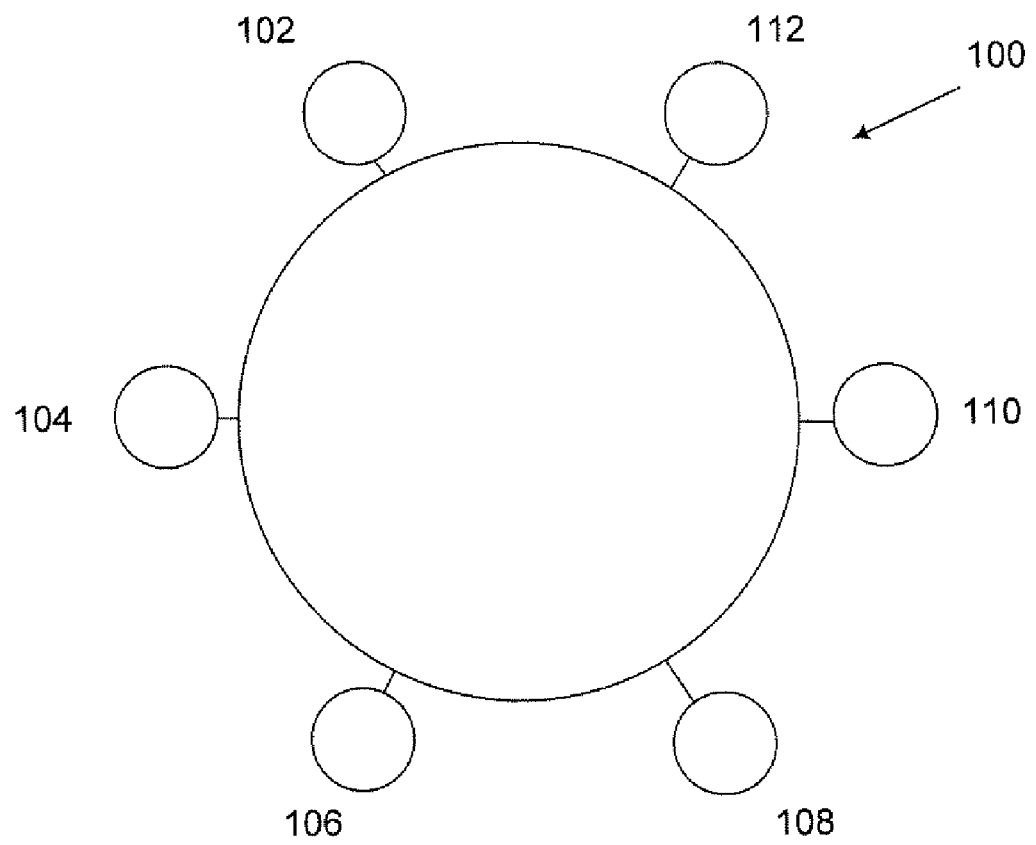

Having thus described the invention in general terms, reference will now be made to the accompanying drawings, which are not necessarily drawn to scale, and wherein:

FIG. 1 is schematic diagram showing the layout of an example gas turbine engine that may be controlled by an embodiment of this invention.

Figure 2:
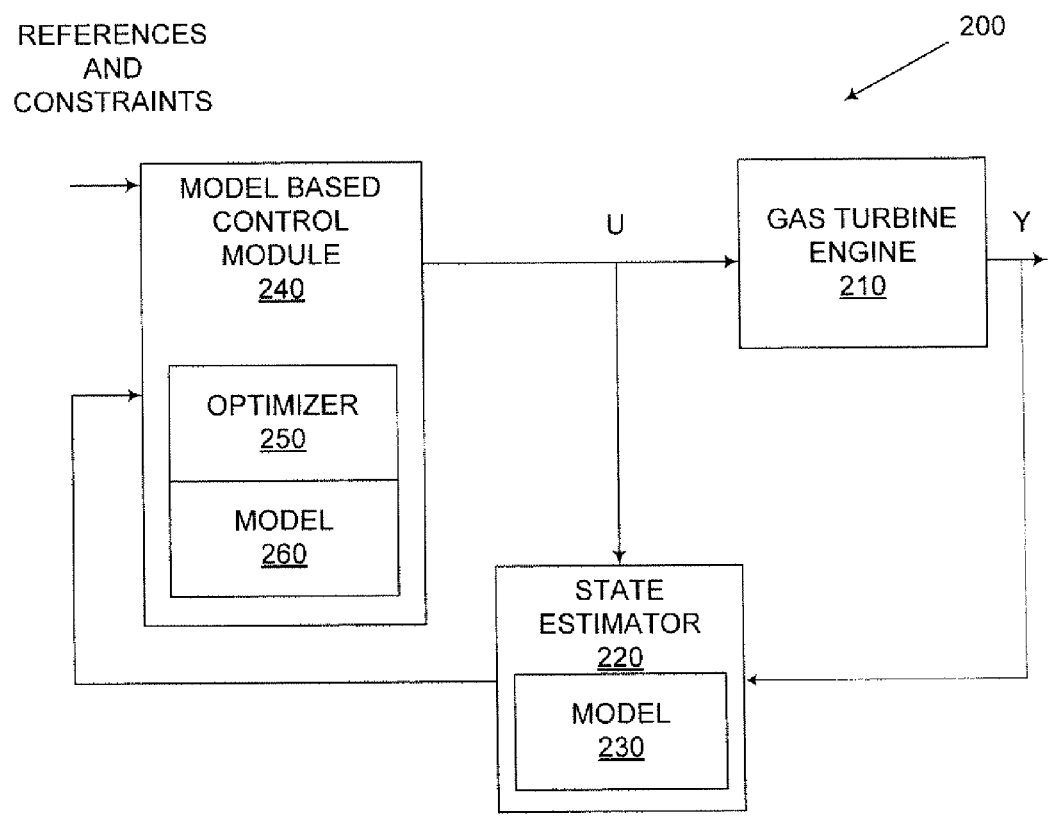

FIG. 2 is a block diagram illustrating components of an engine control system according to an embodiment of the invention.

Figure 3:
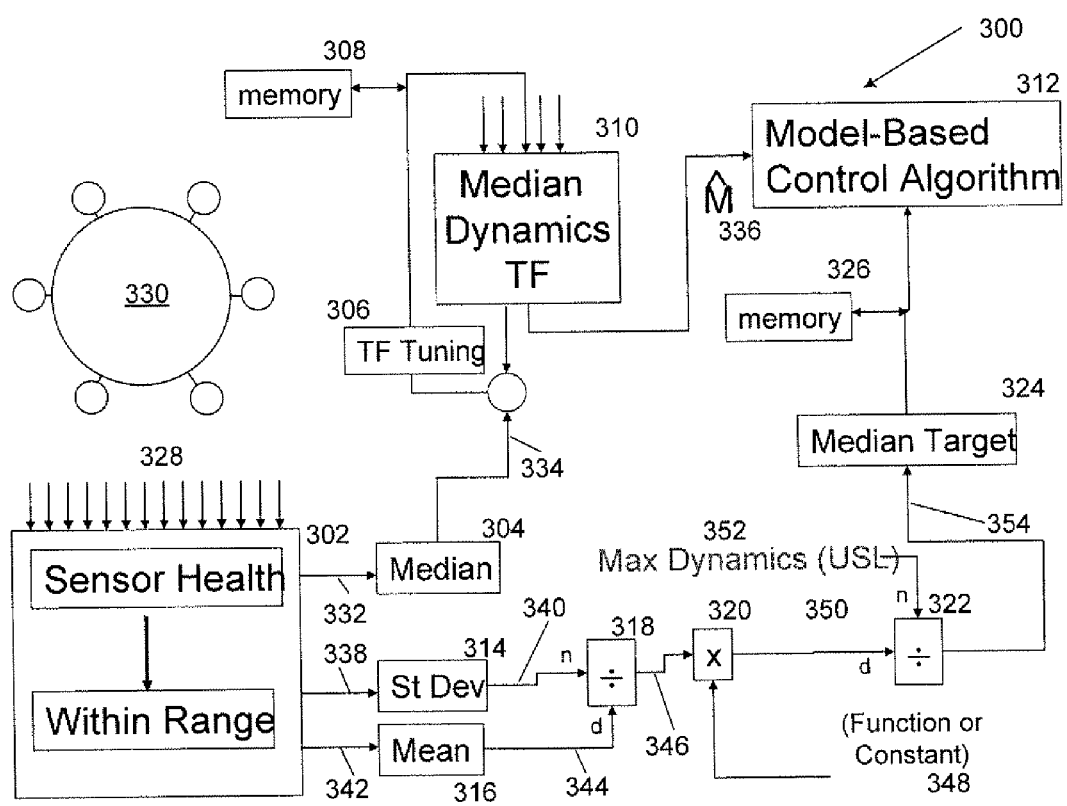

FIG. 3 is a block diagram illustrating an example combustion dynamics tuning model during execution according to one embodiment of the invention.

Figure 4:
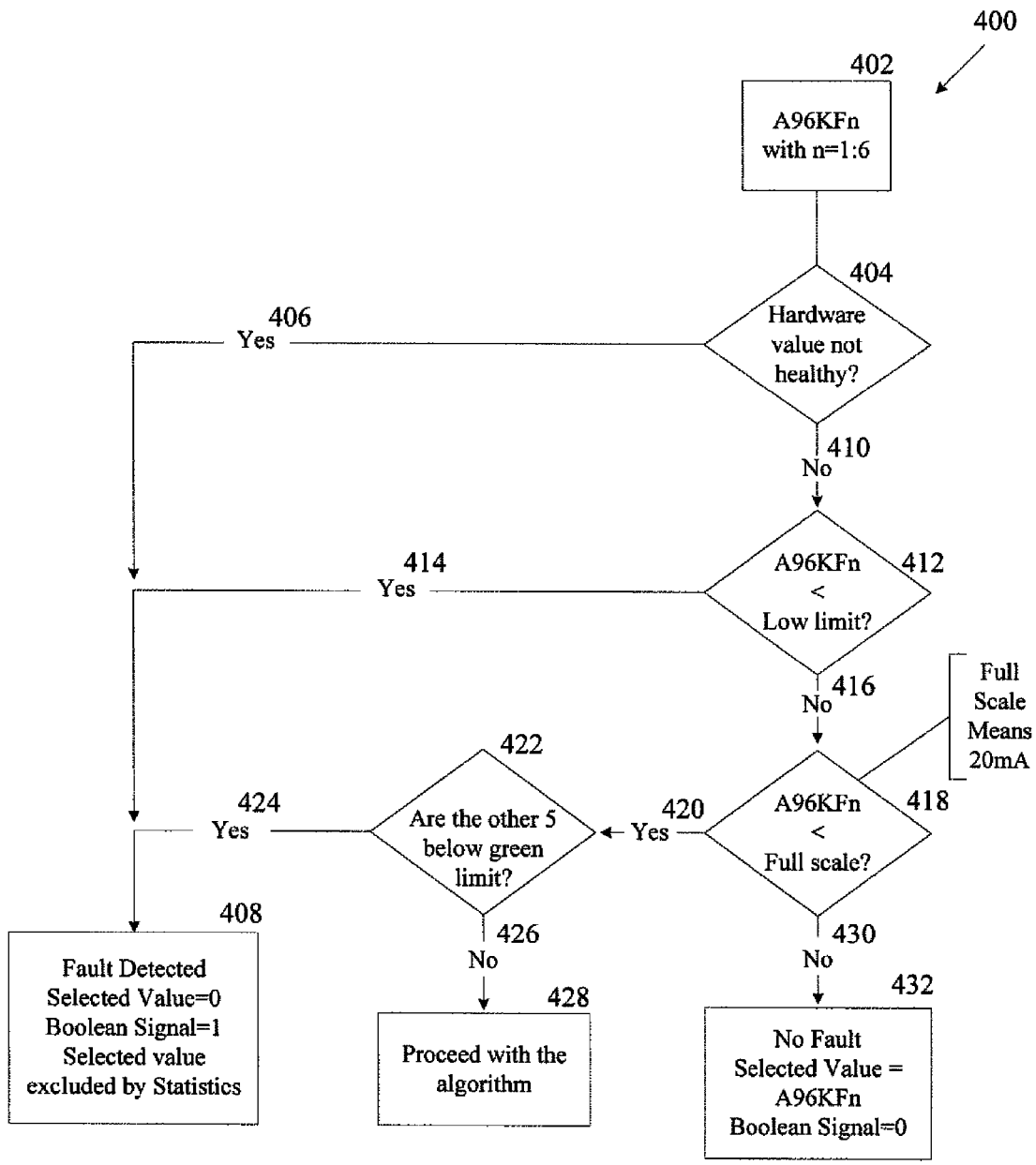
Figure 5:
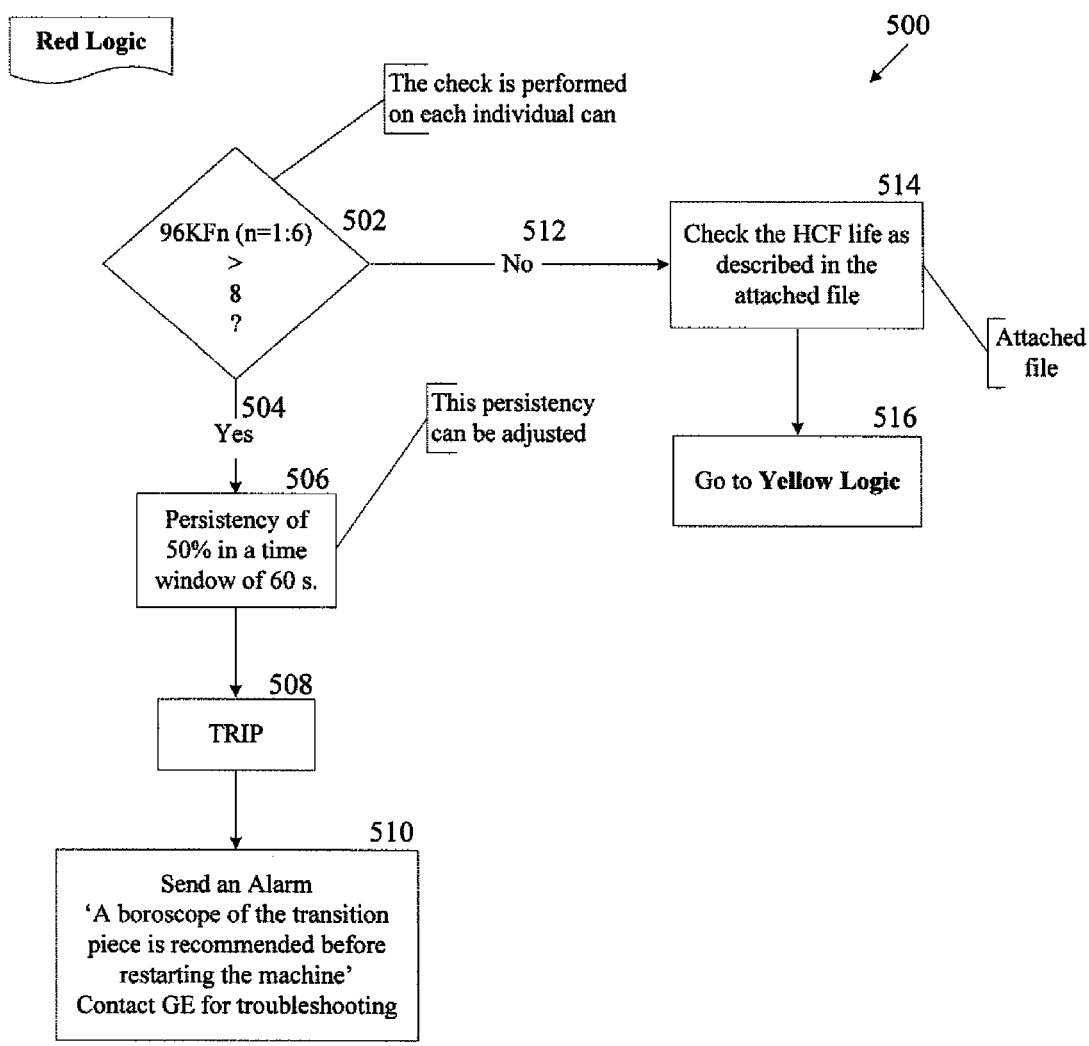

FIGS. 4-5 illustrate example flowcharts for a basic combustion dynamics tuning process and a gas turbine engine according to embodiments of the invention.

FIGS. 6-9 illustrate example flowcharts for an active combustion dynamics tuning process and a gas turbine engine in accordance with embodiments of the invention.

Figure 10:
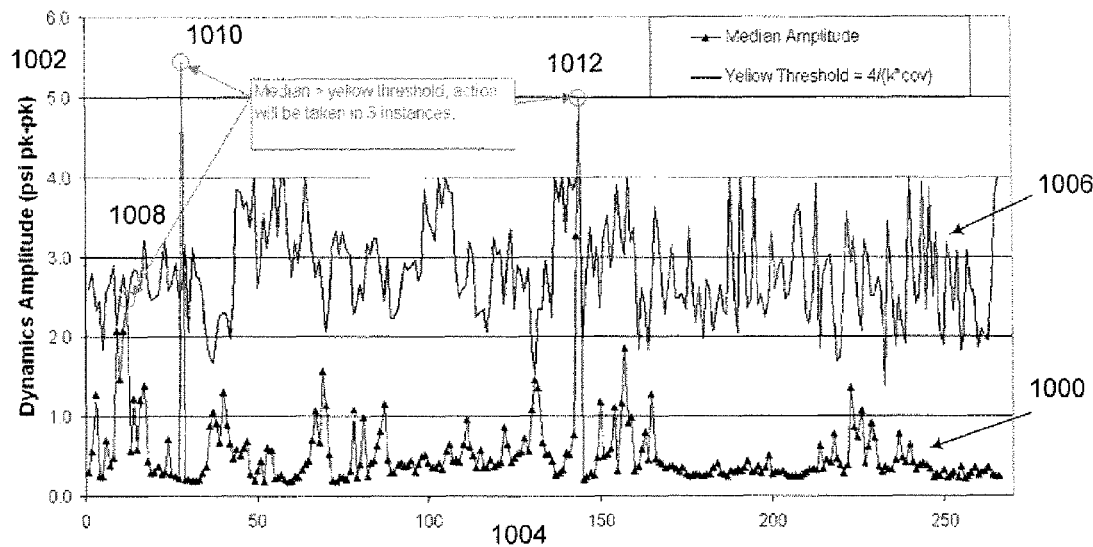

FIG. 10 illustrates example operating frequency data for a combustion dynamics tuning process and gas turbine engine in accordance with an embodiment of the invention.

DETAILED DESCRIPTION OF THE INVENTION

The invention now will be described more fully hereinafter with reference to the accompanying drawings, in which example embodiments of the invention are shown. This invention may, however, be embodied in many different forms and should not be construed as limited to the example embodiments set forth herein; rather, these embodiments are provided so that this disclosure will convey the scope of the invention to those skilled in the art. Like numbers refer to like elements throughout.

Embodiments of the invention are described below with reference to block diagrams and schematic illustrations of methods and systems according to embodiments of the invention. It will be understood that each block of the diagrams, and combinations of blocks in the diagrams can be implemented by computer program instructions. These computer program instructions may be loaded onto one or more general purpose computers, special purpose computers, or other programmable data processing apparatus to produce machines, such that the instructions which execute on the computers or other programmable data processing apparatus create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

In embodiments of this invention, any physical system, control system or property of the engine or engine subsystem may be modeled, including, but not limited to, the engine itself, the gas path and gas path dynamics; actuators, effectors, or other controlling devices that modify or change any engine behavior; sensors, monitors, or sensing systems; the fuel metering system; the fuel delivery system; the lubrication system; and/or the hydraulic system. The models of these components and/or systems may be physics-based models (including their linear approximations). Additionally or alternatively, the models may be based on linear and/or nonlinear system identification, neural networks, and/or combinations of all of these.

Gas turbine engines are air breathing engines that produce work based on the Brayton thermodynamic cycle. Some non-limiting examples of gas turbine engines include: aircraft engines, power systems, propulsion engines for marine applications, turbines used as pumps, turbines used in combined cycle power plants, and turbines used for other industrial applications. In gas turbine engines, thermal energy is drawn from the combustion of fuel with air, the combustion of fuel with an oxidizer, chemical reactions and/or heat exchange with a thermal source. The thermal energy is then converted into useful work. This work can be output in the form of thrust, shaft power or electricity. The performance or operation of these engines is controlled through the use of actuators. Some non-limiting examples of actuators in gas turbine engines include fuel metering valves, inlet guide vanes, variable stator vanes, variable geometry, bleed valves, starter valves, clearance control valves, inlet bleed heat, variable exhaust nozzles, and the like. Some non-limiting examples of sensed engine values include temperatures, pressures, rotor speeds, actuator positions, and/or flows.

Various embodiments of the invention can provide combustion dynamics tuning processes. In one embodiment, a combustion dynamics tuning process can utilize a basic combustion dynamics tuning process during transient operation of a gas turbine engine, and an active combustion dynamics tuning process during steady state operation. When the gas turbine engine is started, the basic combustion dynamics tuning process can be utilized to monitor and diagnose the health of the gas turbine engine. After the behavior of the gas turbine engine has met certain predefined criteria during the startup, the active combustion dynamics tuning process can be initiated to provide active counter-reactions to certain operating frequencies and continue to monitor and diagnose the health of the gas turbine engine.

One example schematic of an example gas turbine engine 100 for use with an embodiment of the invention is shown in FIG. 1. The example engine 100 shown is a can annular combustor system such as the GE Energy Heavy Duty gas turbine series. In another embodiment, the engine 100 can be a GE Model MS5002E gas turbine manufactured by General Electric Power Systems Oil & Gas. Multiple cans 102, 104, 106, 108, 110, 112 also designated as numbers 1 through 14, can be oriented in an annular-shaped configuration. Each can 102-112 can include at least one sensor, such as a dynamic pressure transducer, capable of measuring or otherwise detecting an operating frequency of the can or engine component. In other embodiments of gas turbine engines, different numbers of cans and associated sensors can be utilized. An example of a suitable sensor is a Vibrometer CP233 type dynamic pressure probe. Signals from each sensor can be processed using spectral analysis or similar techniques to isolate a frequency of interest.

In one embodiment, operating frequency data from each can 102-112, such as dynamic pressure measurements, can be processed using a Fast Fourier transformation to determine the frequency content and amplitudes of the frequencies, such as operating amplitudes. Using this information, a frequency distribution such as a histogram can be generated. Based at least in part on the histogram, a representative operating frequency can be selected for the particular can or engine component. As shown in FIG. 3, operating frequency data or selected representative operating frequencies for each can 102-112 can be used as an input, such as 330, to an example combustion dynamics tuning model and algorithm. It will be understood that "operating frequency information" and "operating frequency data" can be used interchangeably, and that both phrases can include, but are not limited to, operating data, operating pressures, dynamic operating pressures, and operating amplitude data.

In one embodiment, operating frequency data in the time domain can include RMS (root mean square) scaled peak-type data. For example, RMS scaled peak-type data can be determined by using the equation 1.41*RMS.

It will be understood by those skilled in the art that the embodiments described herein may be applicable to a variety of systems and are not limited to engines or other devices similar to that described in FIG. 1.

FIG. 2 illustrates a control arrangement implementing an example model according to an embodiment of the invention. The control system 200 shown in FIG. 2 is adapted to monitor and control the physical engine plant or gas turbine engine 210 to provide substantially optimal performance under a variety of conditions. The plant or engine 210 can include sensors which sense or measure values Y of certain parameters. These parameters can include, but are not limited to, fan speed, operating frequencies, dynamic pressures, operating pressures, operating pressure ratios, and temperatures. The plant or engine 210 can also include one or more actuators which can be controlled by one or more command inputs U. The plant or engine 210 may be similar to, for example, the engine 100 illustrated in FIG. 1.

The values Y of the sensed or measured parameters are provided to a state estimator 220. The values input to the state estimator 220, such as sensor inputs, operating frequencies or dynamic pressures, can be used to initialize one or more values in the state estimator 220. The state estimator 220 can include a model 230 of the plant or engine 210. The model 230 can be used by the state estimator 220 to generate one or more state parameters which can include estimates of performance parameters. One example of a suitable model is described in further detail as 300 in FIG. 3.

The state parameters from the state estimator 220 and associated model 230 can be transmitted to a model-based predictive control module or control module 240. In one embodiment the control module can be a controller with an associated output device or display, such as a graphical user interface. The control module 240 can use the state parameters to perform an optimization to determine commands for one or more actuators of the plant or engine 210. For example, the control module 240 can perform an optimization to determine one or more engine control actions and corresponding control commands for one or more actuators of a gas turbine engine. In this regard, the control module 240 can include an optimizer 250 and a model 260. The model 260 associated with the control module 240 may be identical to the model 230 associated with the state estimator 220. Those skilled in the art will recognize that a model can be implemented in either or both the state estimator 220 and control module 240. Using either or both of the models 230, 260 allows optimization of the engine 210 to converge rapidly.

In use, embodiments of the invention can be utilized to initialize the models 230, 260 on startup of the plant or engine 210. Furthermore, embodiments of the invention can be utilized to re-initialize the dynamic states of the models 230, 260 after any time of event, such as load rejection or a sensor failure. Other embodiments of the invention can be used to initialize dynamic states of other types of machines or devices in other circumstances.

FIG. 3 is a schematic diagram illustrating an example model during initial configuration and also during normal execution according to embodiments of the invention. This diagram illustrates data processing by various modules associated with a model 300 such as a combustion dynamics tuning algorithm model. As shown, the model 300 can include some or all of the following modules in accordance with embodiments of the invention: sensor health block 302; median block 304; transfer function (TF) tuning block 306; a memory block 308; median dynamics block 310; model based control algorithm block 312; standard deviation block 314; mean block 316; covariance block 318, constant block 320; median dynamics block 322; median target block 324; and a memory block 326. The module blocks 302-326 represent various "run time"-type modules for which various parameters can be input to each of the modules 302-326, and respective corresponding outputs can be received from the modules 302-326 in accordance with embodiments of the invention. Those skilled in the art will recognize that various inputs and outputs can be configured as data inputs, vectors, matrices, functions, and other mathematical-type devices. In any instance, the example model 300 shown can determine model predictions and dynamically tune combustion model predictions to measured performances in a real time environment for a gas turbine engine, such as 100 in FIG. 1, or a similar device. The example model 300 can be implemented with the gas turbine engine shown as 100 in FIG. 1, and the system shown as 200 in FIG. 2.

Sensor health block 302 receives one or more inputs 328 from an engine 330, similar to engine 100 shown in FIG. 1. For example, the inputs can be operating frequency information or dynamic pressure information from one or more sensors associated with respective cans oriented in an annular-shaped configuration. In the embodiment shown in FIG. 3, inputs from 6 sensors, one for each can of can-annular type engine can be obtained. In addition, the sensor health block 302 can determine whether some or all of the inputs 328 are within a predefined range by comparing the inputs 328 to a previously stored set of data.

In other embodiments, any number of inputs from the engine, or any number of cans associated with the engine can be input to the sensor health block 302.

In one embodiment, a determination whether to use some or all of the inputs 328 can be made depending on whether some or all of the inputs 328 are within a predefined range. In the event that some or all of the inputs 328 are not within a predefined range, some or all of the inputs 328 can be rejected, and no further action with respect to some or all of the inputs 328. Alternatively, additional data may be used to replace some or all of the inputs 328. In the event that some or all of the inputs 328 are within a predefined range, some or all of the inputs 328 can be further processed by other components of the model 300.

In the event that some or all of the inputs are within a predefined range, some or all of the inputs can be transmitted via 332 to the median block 304. The median block 304 can determine a median value 334 based on some or all of the inputs 330 transmitted. The median value 334 can be transmitted to the transfer function (TF) tuning block 306 for storage in and subsequent retrieval from memory block 308. In addition, the median value 334 can be input to the median dynamics transfer function (TF) block 310.

The median dynamics transfer function (TF) block 310 utilizes the median value 334 with a median dynamics transfer function to determine an input "M hat" 336 to the model based control algorithm block 312. As shown by the multiple input arrows to the median dynamics transfer function (TF) block 310, additional median values for other operating frequencies can be input and simultaneously processed.

Utilizing only the median value 334 associated with the input "M hat" 336, control of the engine 330 by the model based control algorithm block 312 may be prone to problems when variations between can-to-can operating frequencies of the engine 330 are relatively large.

Referring back to sensor health block 302, some or all of the inputs 328, such as operating frequency information, is input to standard deviation block 314 via 338, where a standard deviation 340 can be determined. Furthermore, some or all of the inputs 328, such as operating frequency information, is input to mean block 316 via 342, where a mean 344 can be determined. Based at least in part on the standard deviation 340 and mean 344 input to the covariance block 318, the covariance block 318 can determine covariance between the inputs 328 associated with the cans of the engine 330. For example, the mean 344 can be divided by the standard deviation 340 to determine a covariance value 346 representative of the operation of the engine 330.

In one embodiment, the covariance value 346 can be modified by an engine-dependent function, such as 348. For example, an engine-dependent function can be determined based on prior data taken over time from one or more of a series of similar engines. Turning now to the constant block 320, the covariance value 346 can be multiplied or otherwise adjusted by the engine-dependent function 348 to determine a "maximum to median" dynamics ratio 350 representative of the operation of the engine 330.

Depending on prior operating performance of engine 330, an upper specification limit (USL) 352 can be predefined based on the highest or maximum operating frequency or dynamic pressure that the engine 332 may be safely operated at, or any other desired upper operating limit. As represented by the median dynamics block 322, the "maximum to median" dynamics ratio 350 can be adjusted or otherwise modified by the USL 352. In this instance, maximum to median" dynamics ratio 350 can be divided by the USL 352 to obtain a median target 354 or median value.

The median target 354 can be transmitted by the median target block 324 to be stored in memory block 326 for subsequent retrieval. Ultimately, the median target 354 can be input to the model based control algorithm block 312.

Utilizing the median target 354, control of the engine 330 by the model based control algorithm block 312 may be improved since variations between cans of the engine 330 can be accounted for. Control of the engine 330 in this manner can minimize the influence of poor sensor measurements by maintaining a maximum combustion dynamics limit on some or all of the cans associated with the engine 330. In one embodiment, as the median target 354 is continuously calculated and input to the model based control algorithm block 312, the control loop 302-310, 314-328, 332-354 is continuously "closed" and improved control of the engine 330 can result. In another embodiment, simultaneous or other real time processing of other operating frequencies can be performed and processed by the model 300 shown.

In use, some or all of the above processes and instructions can be used, and repeated as needed, to automatically and dynamically tune combustion in multiple cans of an engine, such as a can annular combustion engine, during model execution at any particular time. In this manner, the engine can be configured to "tune" the operating state of the combustion dynamics algorithm model to match measured dynamic performance of the engine or other device of interest.

Figure 6:
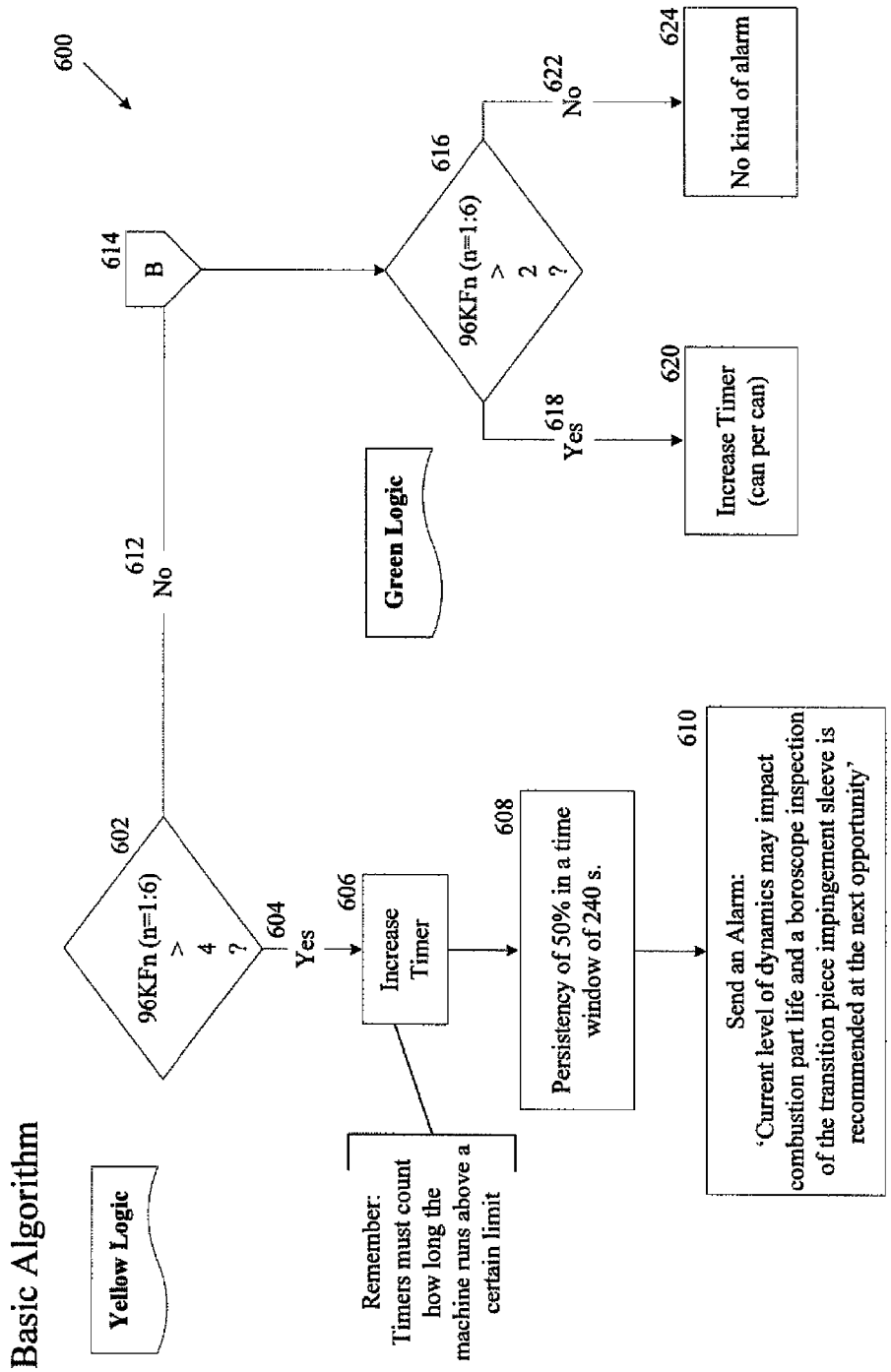
Figure 7:
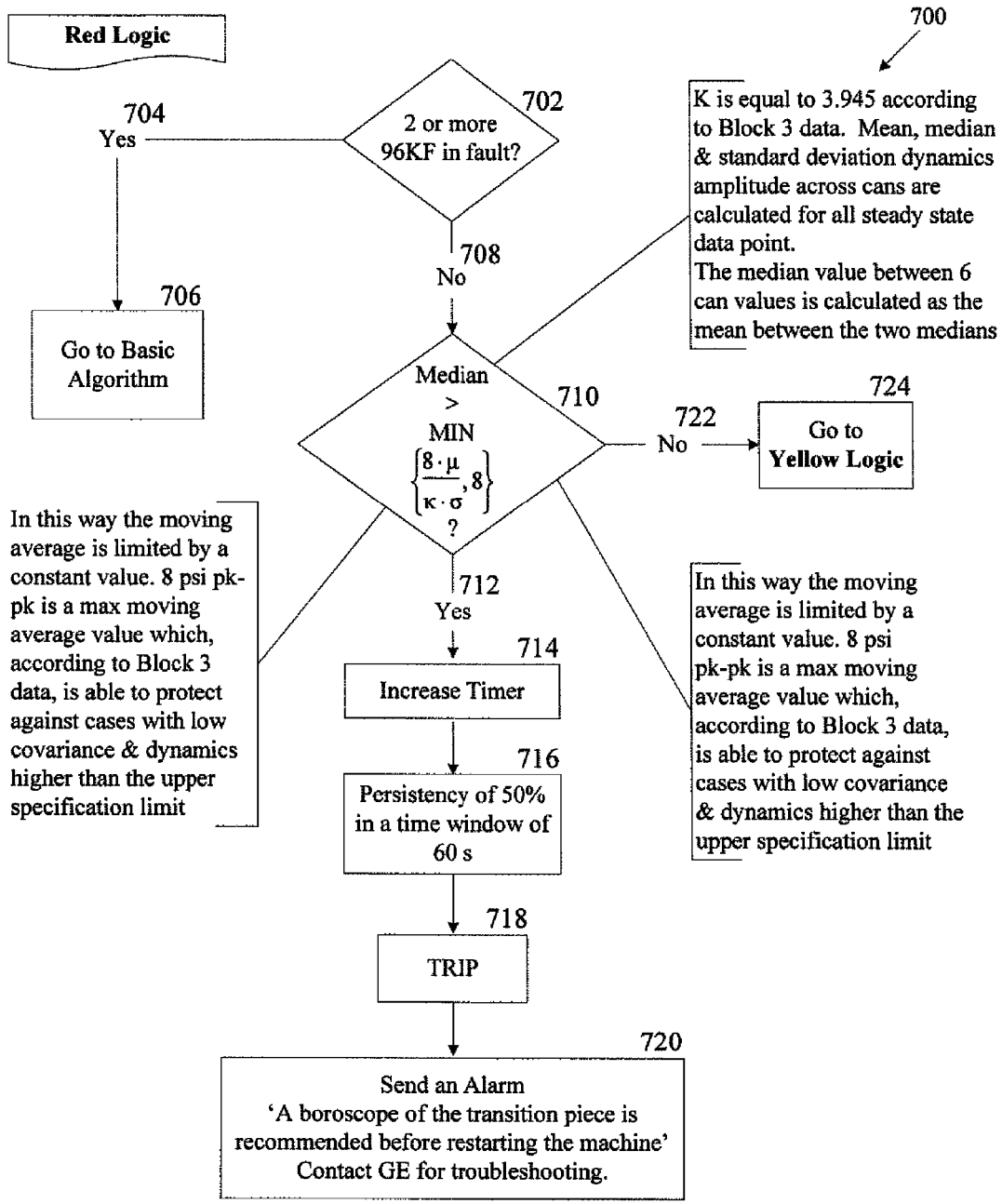
Figure 8:
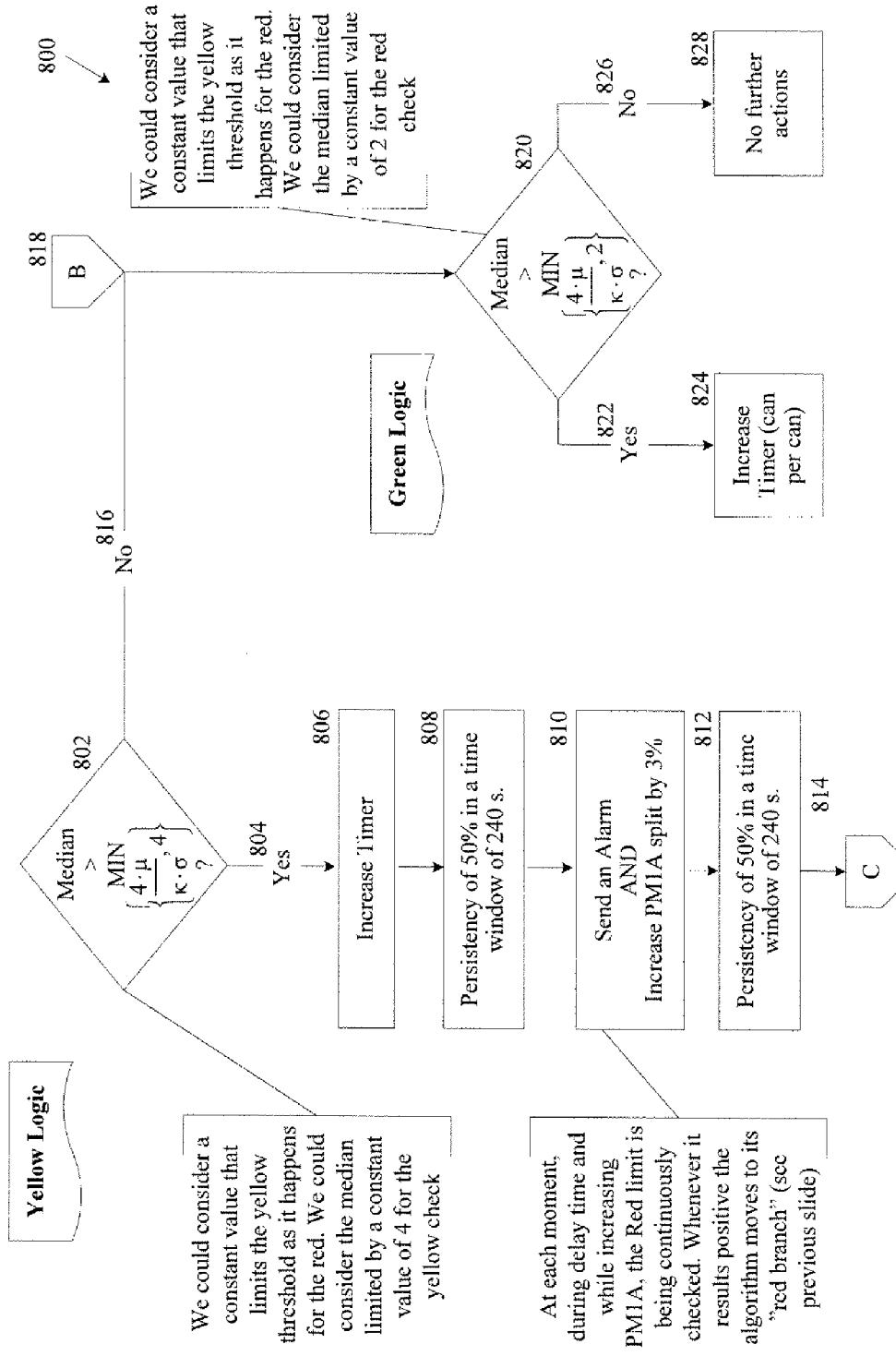
Figure 9:
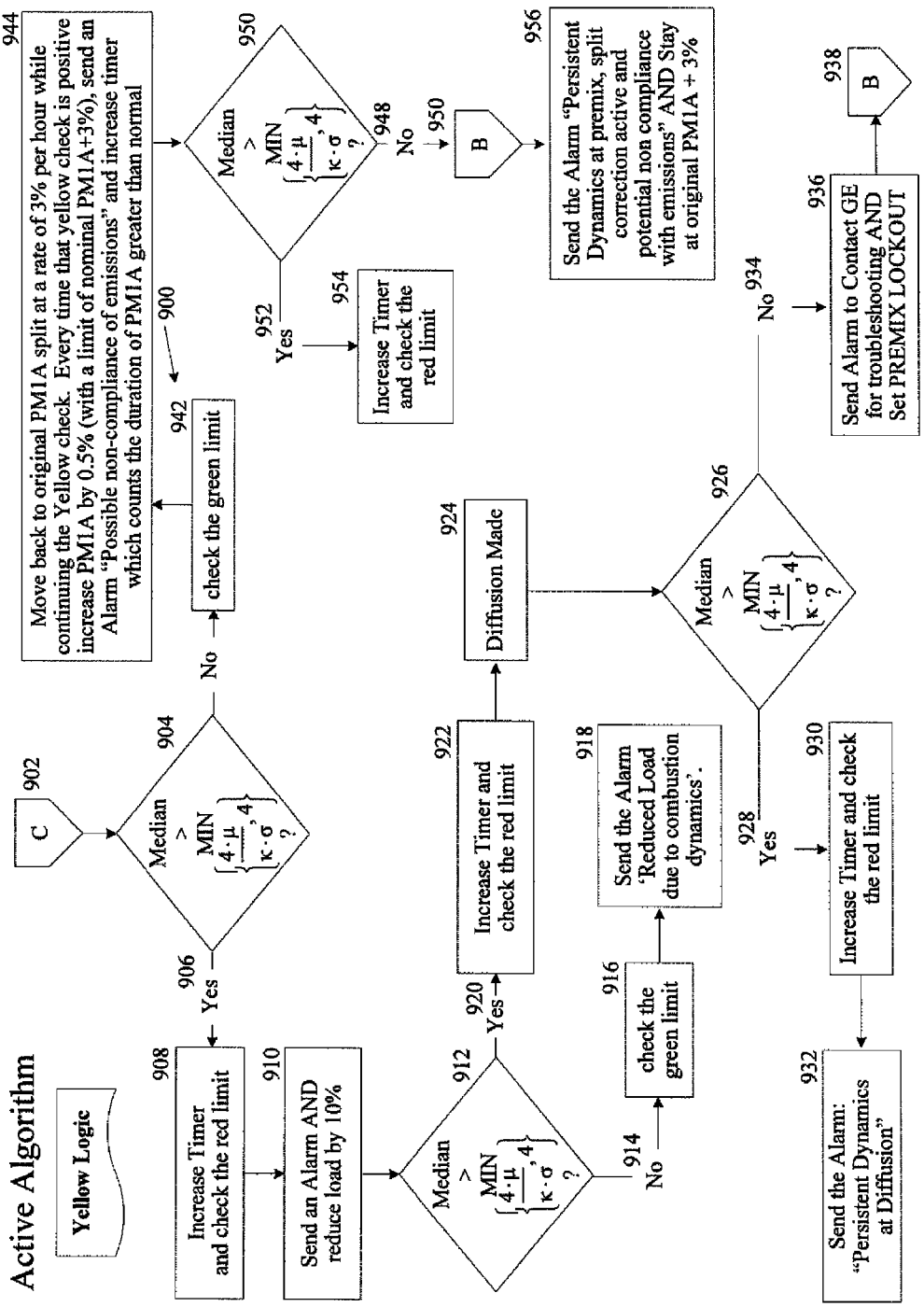

FIGS. 4-9 illustrate example flowcharts for combustion dynamics tuning processes for a gas turbine engine according to embodiments of the invention. In particular, FIG. 4 illustrates an example startup combustion dynamics tuning process; FIGS. 5 and 6 illustrate example basic combustion dynamics tuning processes; and FIGS. 7, 8, and 9 illustrate example active combustion dynamics tuning processes. Some or all of the processes of FIGS. 4-9 can be utilized with the example control system 200 in FIG. 2 and example model 300 in FIG. 3. In one embodiment, a combustion dynamics tuning process can implement some or all of the processes in FIGS. 4-9 depending on the measured dynamic operating frequencies for a particular gas turbine engine.

In FIG. 4, an example startup combustion dynamics tuning process 400 is shown. Generally, the startup process of FIG. 4 can be used on startup of a gas turbine engine. In particular, the example process 400 tests whether sensors associated with a gas turbine engine are healthy, and whether some or all of the sensor measurements are within a predefined range, such as between an upper operating limit and lower operating limit, for suitable control of the gas turbine engine. This particular process 400 can be implemented with the example gas turbine engine 100 in FIG. 1, model-based control system 200 in FIG. 2, and dynamic combustion tuning model 300 in FIG. 3. Other embodiments of the startup process can be implemented with other types of gas turbine engines, model-based control or other types of control systems, and dynamic combustion tuning or other combustion tuning models.

The startup process 400 begins at block 402. At block 402, operating frequency information is received from at least one sensor associated with a respective can. In this embodiment, at least one signal from a pressure transmitters, such as a Model A96KF pressure transmitter, can be received by a controller, such as a model based control module 240 in FIG. 2.

Block 402 is followed by decision block 404, in which a determination is made whether the particular sensor is healthy. In this embodiment, a determination can be made by a controller, such as 240, based on whether a signal is received from the at least one sensor for a predefined time, such as 2 seconds. If a signal is not received from the at least one sensor for the predefined time, the "Yes" branch 406 can be followed to block 408.

In block 408, a fault indication can be transmitted to a user. In this embodiment, the controller, such as 240 can transmit a fault indication to a user via a suitable user interface, such as a graphical display. An example fault indication can be a message indicating at least one sensor fault has been detected or that there is a combustor dynamic pressure input fault alarm. Measurements from the particular sensor indicating a fault can be excluded from subsequent statistical calculations or treatments of the operating frequency information. For example, measurements from a particular sensor can be excluded from the inputs to the sensor health block 302 in FIG. 3, and further excluded from subsequent calculations using the model 300 of FIG. 3, including the calculation of a median value. For example, in the instance that only a single sensor is faulty, an active combustion dynamics tuning process, such as 700, 800, 900 can be initiated while excluding subsequent sensor inputs from the calculation of the median value.

Referring back to decision block 404, if a healthy signal is received from the at least one sensor, the "No" branch 410 can be followed to decision block 412. In decision block 412, a determination whether the at least one sensor measurement is below a lower operating limit. In this embodiment, a controller such as 240 determines whether the at least one sensor measurement is below a lower operating limit. An example lower operating limit can be a lower physical limit for the operating frequency information, such as approximately 0.3 KPa peak-to-peak. If the sensor measurement is below the lower operating limit, the "Yes" branch 414 can be followed to block 408 described above.

Referring back to decision block 412, if the at least one sensor measurement is not below the lower operating limit, the "No" branch 416 can be followed to decision block 418. In decision block 418, a determination whether the sensor measurement is above an upper operating limit. In this embodiment, a controller such as 240 determines whether the sensor measurement is above an upper operating limit. An example operating limit can be an upper physical limit for the operating frequency information, such as approximately 100 Kpa peak-to-peak. If the sensor measurement is above the upper threshold limit, the "Yes" branch 420 can be followed to decision block 422.

In decision block 422, a determination whether the other sensor measurements are below a lower or green threshold. In this embodiment, a controller such as 240 can determine whether the other sensor measurements are below a lower or green threshold. If the other sensor measurements are below a lower or green threshold, it is likely that only a single sensor is faulty, and the "Yes" branch 424 is followed to block 408 described above.

Referring back to decision block 422, if the other sensor measurements are not below a lower or green threshold, it is likely that more than sensor is faulty, and the "No" branch 426 is followed to block 428. In block 428, a combustion dynamics tuning process can be initiated. Example basic combustion dynamics tuning processes are illustrated as 500, 600 with respect to FIGS. 5 and 6 described below. In the instance that only 1 or 2 sensors are faulty, an active combustion dynamics tuning process, such as 700, 800, 900 can be initiated. In the instance that more than 2 sensors are faulty, then a basic combustion dynamics tuning process, such as 500, 600, can be initiated.

Referring back to decision block 418, if a sensor measurement is not above the upper operating limit, the "No" branch 430 can be followed to block 432. In block 432, a no fault indication can be transmitted to a user. In this embodiment a controller such as 240 can determine whether the sensor measurement is above the upper operating limit. An example no fault indication can be a message indicating that no sensor fault has been detected. Measurements from some or all of the healthy sensors can be included with subsequent statistical calculations or treatments of the operating frequency information. For example, measurements from a particular sensor can be included with the inputs to the sensor health block 302 in FIG. 3, and further included with subsequent calculations using the model 300 of FIG. 3, including the calculation of a median value. In the instance where there is no sensor fault, an active combustion dynamics tuning process, such as 700, 800, 900 can be initiated.

As needed, some or all of the elements of method 400 can be repeated as necessary for each of the other sensors.

FIGS. 5 and 6 illustrate example basic combustion dynamics tuning processes. Generally, a basic combustion dynamics tuning process, such as 500, 600, is adapted to monitor the initial startup of a gas turbine engine by monitoring dynamic operating frequencies and providing alarms as needed. In particular, FIG. 5 illustrates a method 500 for monitoring dynamic frequencies of a gas turbine engine and providing a "trip" alarm if needed.

The method 500 begins at decision block 502. In block 502, a determination is made whether at least one of the sensor measurements exceeds a threshold of approximately 8 psi. In this embodiment, signals from respective pressure transmitters, such as Model A96KF pressure transmitters, can be received by a controller such as 240 and compared against a threshold, such as approximately 8 psi.

If a particular sensor measurement exceeds the threshold, then the "Yes" branch 504 to block 506. In block 506, a persistency of the sensor measurement is determined by the controller, such as 240. For example, if the controller 240 determines that the sensor measurement persists for a predefined amount of time, such as approximately 50% persistency for about 60 seconds, the method 500 can continue to block 508. In this example, the persistency measure can be defined to protect the operation of the gas turbine engine by controlling the amount of the time the gas turbine engine operates at or above a certain operating frequency. In other embodiments, the persistency increments and timing can be adjusted as needed.

In block 508, a trip command can be initiated, and a corresponding engine control command can be transmitted by the controller. In this embodiment, a trip command can be an engine control command implemented by a controller, such as 240, which ceases certain operations of the gas turbine engine.

Block 508 is followed by block 510, in which an indication can be transmitted to a user. In this example, a controller such as 240 can transmit an indication to a user via a user interface associated with the controller. For instance, an alarm message stating that "A horoscope of the transition piece is recommended before restarting the machine—Contact the OEM for troubleshooting" can be transmitted via a graphical user interface or display.

Referring back to decision block 502, if the particular sensor measurement does not exceed the threshold, then the "No" branch 512 is followed to block 514. In block 514, one or more sub-processes or tests can be implemented by a controller, such as 240, prior to proceeding to an additional basic combustion dynamics tuning process.

Block 514 is followed by block 516, in which the basic combustion dynamics tuning process 600 of FIG. 6 begins.

In FIG. 6, the method 600 can monitor dynamic frequencies of a gas turbine engine and provide an additional alarm if needed. The method 600 begins at block 602.

In block 602, a determination is made whether any of the sensor measurements exceed a threshold of approximately 4 psi. In this embodiment, signals from respective pressure transmitters, such as Model A96KF pressure transmitters, can be received by a controller, such as 240, and compared against a threshold, such as approximately 4 psi.

If a particular sensor measurement exceeds the threshold, then the "Yes" branch 604 to block 606. In block 606, the controller can initiate a timer count for a predefined amount of time. In this example, a controller such as 240 can initiate a timer for approximately 240 seconds. In other embodiments, the timer can be initiated for other count durations.

Block 606 is followed by block 608, in which a persistency of the sensor measurement is determined. For example, if the controller such as 240 determines that the sensor measurement persists for a predefined amount of time, such as approximately 50% persistency for about 240 seconds, the method 600 can continue to block 610. In other embodiments, the persistency increments and timing can be adjusted as needed.

In block 610, an indication can be transmitted to a user. In this example, a controller such as 240 can transmit an indication to a user via a graphical user interface. An example indication can be an alarm message stating that "Current level of dynamics may impact combustion part life and a boroscope inspection of the transition piece impingement sleeve is recommended at the next opportunity."

Referring back to decision block 602, if the particular sensor measurement does not exceed the threshold, then the "No" branch 612 is followed to branch block "B" 614. Branch block "B" 614 is followed by decision block 616. In decision block 616, a determination is made whether any of the sensor measurements exceed a lower threshold of approximately 2 psi. In this embodiment, signals from respective pressure transmitters, such as Model A96KF pressure transmitters, can be received by a controller such as 240, and compared against a lower threshold, such as approximately 2 psi.

If a particular sensor measurement exceeds the threshold, then the "Yes" branch 618 to block 620. In block 620, the controller can increase a timer count for each can for a predefined amount of time. In this example, a timer can be initiated for approximately 1080 seconds. In other embodiments, the timer count can be increased for other count durations.

Referring back to decision block 616, if the particular sensor measurement does not exceed the threshold, then the "No" branch 622 is followed to block 624. In block 624, no indication of an alarm is transmitted to the user.

The method 600 ends at block 624. As needed, some or all of the elements of method 600 can be repeated.

FIGS. 7, 8, and 9 illustrate example active combustion dynamics tuning processes. Generally, an active combustion dynamics tuning process, such as 700, 800, 900, is adapted to monitor the steady state operation of a gas turbine engine by monitoring dynamic operating frequencies, providing alarms as needed, countering particular combustion dynamics, and implementing certain engine control commands for the gas turbine engine. In this embodiment, an active combustion dynamics tuning process, such as 700, can be implemented by a controller of a gas turbine engine after a basic combustion dynamics tuning process, such as 600, has been implemented. In particular, FIG. 7 illustrates a method 700 for monitoring dynamic frequencies of a gas turbine engine and providing a "trip" alarm if needed.

The method 700 begins at decision block 702. In decision block 702, a determination is made whether two or more sensors are in fault. In this embodiment, signals from respective pressure transmitters, such as Model A96KF pressure transmitters, can be received by a controller such as 240, and a check is performed by the controller 240 on whether two or more of the sensors are in a fault condition, such as any of the conditions described by FIG. 4. If a fault condition exists for two or more sensors, the gas turbine engine should likely not be operated using an active combustion dynamic tuning process, such as 700, and the "YES" branch 704 is followed to block 706.

In block 706, a basic combustion dynamics tuning process, such as 500 in FIG. 5, is initiated, and the method 700 ends.

Referring back to decision block 702, if two or more sensors are not in a fault condition, then the "No" branch 708 is followed to decision block 710. In decision block 710, a determination is made whether a median value for the operating frequency information is above an upper or red logic threshold. In this embodiment, a controller such as 240 can determine whether the median value for the operating frequency information associated with the cans of the gas turbine engine is above an upper threshold of approximately 8 psi peak-to-peak. A median value can be determined similar to the calculations for a median value in FIG. 3.

If the upper threshold is exceeded, then the "Yes" branch 712 is followed to block 714. In block 714, a controller such as 240 can initiate a timer count for a predefined amount of time. In this example, a timer can be initiated for approximately 60 seconds. In other embodiments, the timer count can be initiated or otherwise increased for other count durations.

Block 714 is followed by block 716, in which a persistency of the sensor measurement is confirmed. For example, the controller 240 can determine whether the sensor measurement persists for a predefined amount of time, such as approximately 50% persistency for about 60 seconds. In this instance, when the persistency of sensor measurement is determined, the controller 240 can determine the duration of the gas turbine engine operation at this frequency, and the method 700 can continue to block 718. In other embodiments, the persistency increments and timing can be adjusted as needed.

In block 718, a trip command can be initiated, and a corresponding engine control command can be transmitted by the controller. In this embodiment, a trip command can be an engine control command implemented by a controller, such as 240, which ceases certain operations of the gas turbine engine.

Block 718 is followed by block 720, in which an indication can be transmitted to a user. In this example, a controller such as 240 can transmit an indication to a user via a user interface associated with the controller. For instance, an alarm message stating that "A boroscope of the transition piece is recommended before restarting the machine—Contact the OEM for troubleshooting" can be transmitted via a graphical user interface or display.

Referring back to decision block 710, if the upper threshold is not exceeded by the median value, then the "No" branch 722 is followed to block 724. In block 724, an additional active combustion dynamics tuning process, such as 800 in FIG. 8, can begin, and the method 700 ends.

FIG. 8 illustrates a method 800 for monitoring dynamic frequencies of a gas turbine engine and providing an alarm and implementing an engine control if needed.

The method 800 begins at decision block 802. In decision block 802, a determination is made whether a median value for the operating frequency information is above an intermediate or yellow logic threshold. In this embodiment, a controller such as 240 can determine whether the median value for the operating frequency information associated with the cans of the gas turbine engine is above an intermediate threshold of approximately 4 psi peak-to-peak.

If the intermediate threshold is exceeded, then the "Yes" branch 804 is followed to block 806. In block 806, the controller can increase a timer count for a predefined amount of time. In this example, a controller such as 240 can initiate a timer for approximately 240 seconds. In other embodiments, the timer count can be initiated or otherwise increased for other count durations.

Block 806 is followed by block 808, in which a persistency of the sensor measurement is confirmed. For example, the controller 240 can determine whether the sensor measurement persists for a predefined amount of time, such as approximately 50% persistency for about 240 seconds. In this instance, when the persistency of sensor measurement is determined, the controller 240 can determine the duration of the gas turbine engine operation at this frequency, and the method 800 can continue to block 810. In other embodiments, the persistency increments and timing can be adjusted as needed.

In block 810, an indication can be transmitted to a user and an engine control command can be implemented by the controller. In this example, a controller such as 240 can transmit an indication to a user via a user interface associated with the controller. An example indication transmitted by the controller 240 via a graphical user interface or display can be an alarm message stating that "Current level of dynamics may impact combustion part life—operational adjustments are in progress." Furthermore, an engine control command can be transmitted by the controller 240 to adjust fuel splits between burners associated with the gas turbine engine. For instance, the PM1A fuel split can be gradually increased by a predefined amount, such as approximately 3%. In other embodiments, the fuel split can be increased in other amounts, or other indications or engine control commands can be implemented.

In one embodiment, while the persistency is being checked in block 808 and the engine control command is being implemented in block 810, the median value for the operating frequency information can be continuously checked by a controller, such as 240, against the upper threshold, as described in block 710 in FIG. 7.

Block 810 is followed by block 812, in which a persistency of the new sensor measurement is confirmed. After implementation of the engine control command by the controller 240, such as the increase in the PM1A fuel split, the operating frequencies may change accordingly and the sensor measurement should be checked. For example, if the new sensor measurement persists for a predefined amount of time, such as approximately 50% persistency for about 240 seconds, then the sensor measurement can be confirmed, and the method 800 can continue to branch block "C" 814, which is the same as branch block "C" 902 in FIG. 9. In other embodiments, the persistency can be adjusted as needed.

Referring back to decision block 802, if the intermediate threshold is not exceeded by the median value, then the "No" branch 816 is followed to branch block "B" 818. Branch block "B" 818 is followed by decision block 820.

In decision block 820, a determination is made whether any of the sensor measurements exceed a lower or green logic threshold of approximately 2 psi. In this embodiment, signals from respective pressure transmitters, such as Model A96KF pressure transmitters, can be received by a controller, such as 240, and compared against a lower threshold, such as approximately 2 psi.

If a particular sensor measurement exceeds the threshold, then the "Yes" branch 822 to block 824. In block 824, a controller can initiate or increase a timer count for each can for a predefined amount of time. In this example, the controller 240 a timer can be initiated or increased for approximately 1080 seconds. In other embodiments, the timer count can be initiated or increased for other count durations.

Referring back to decision block 820, if the particular sensor measurement does not exceed the lower threshold, then the "No" branch 826 is followed to block 828. In block 828, no indication of an alarm is transmitted by a controller to the user, and no further action needs be taken.

The method 800 ends at block 828.

FIG. 9 illustrates a method 900 for monitoring dynamic frequencies of a gas turbine engine and providing an alarm and implementing an engine control if needed.

The method 900 begins at branch block "C" 902 in FIG. 9. Branch block 902 is followed by decision block 904.

In decision block 904, a determination is made whether a median value for the operating frequency information is above an intermediate or yellow logic threshold. In this embodiment, a controller, such as 240, determines whether the median value for the operating frequency information associated with the cans of the gas turbine engine is above an intermediate threshold of approximately 4 psi peak-to-peak.

If the intermediate threshold is exceeded, then the "Yes" branch 906 is followed to block 908. In block 908, the controller can increase a timer count for a predefined amount of time and check the upper threshold. In this example, the controller 240 can initiate or increase a timer for approximately 240 seconds. Furthermore, the median value for the operating frequency information is compared to determine whether the upper or red logic threshold is exceeded. In other embodiments, the timer count can be initiated or increased for other count durations.

Block 908 is followed by block 910, in which an indication is transmitted to a user and an engine control command can be implemented by the controller. In this example, a controller such as 240 can provide an indication to a user. An example indication can be an alarm message stating that "Current level of dynamics may impact combustion part life—operational adjustments are in progress." Furthermore, an engine control command can be transmitted by the controller 240 to reduce the load of the gas turbine engine. For instance, the gas turbine engine load can be gradually decreased by a predefined amount, such as approximately 10%. In other embodiments, the gas turbine load can be decreased in other amounts, or other indications or engine control commands can be implemented.

In one embodiment involving a mechanical drive application, a similar indication with the alarm message described above can be transmitted to a user, and an engine control command to facilitate the reduction in combustion reference temperature (TTRF) can be implemented.

Block 910 is followed by decision block 912, in which a determination is made whether a median value for the operating frequency information is above an intermediate or yellow logic threshold. In this embodiment, a controller such as 240 can determine whether the median value for the operating frequency information associated with the cans of the gas turbine engine is above an intermediate threshold of approximately 4 psi peak-to-peak.

If the intermediate threshold is not exceeded, then the "No" branch 914 is followed to block 916. In block 916, the median value can be compared to the lower or green logic threshold. In this embodiment, the controller 240 can confirm that the median value is within the lower threshold, such as 2 psi peak-to-peak.

Block 916 is followed by block 918, in which an indication is transmitted to a user. In this example, the controller 240 can provide an indication to a user. An example indication can be an alarm message stating that "Reduced load due to combustion dynamics." In this instance, a user can gradually increase the gas turbine engine load while monitoring the operating frequencies. In other embodiments, other indications can be implemented.

In one embodiment, if a user is unable to operate the gas turbine engine at a sufficient load, the user can request permission to operate the gas turbine engine using a basic combustion dynamics tuning process, such as 500 or 600.

Referring back to decision block 912, if the intermediate threshold is exceeded, then the "Yes" branch 920 is followed to block 922. In block 922, the controller 240 can increase a timer count for a predefined amount of time and check the upper threshold. In this example, a controller can initiate or increase a timer for approximately 240 seconds. Furthermore, the median value for the operating frequency information is compared to determine whether the upper or red logic threshold is exceeded. In other embodiments, the timer count can be initiated or increased for other count durations.

Block 922 is followed by block 924, in which an engine control command can be implemented by the controller. In this example, the controller 240 can operate the gas turbine engine in a relatively safe diffusion mode or other mode to protect the gas turbine engine. In other embodiments, other engine control commands can be implemented by the controller 240.

Block 924 is followed by decision block 926, in which a determination is made whether a median value for the operating frequency information is above an intermediate or yellow logic threshold. In this embodiment, a controller such as 240 can determine whether the median value for the operating frequency information associated with the cans of the gas turbine engine is above an intermediate threshold of approximately 4 psi peak-to-peak.

If the intermediate threshold is exceeded, then the "Yes" branch 928 is followed to block 930. In block 930, the controller 240 can initiate or increase a timer count for a predefined amount of time and check the upper threshold. In this example, a timer can be initiated or increased for approximately 240 seconds. Furthermore, the median value for the operating frequency information is compared to determine whether the upper or red logic threshold is exceeded. In other embodiments, the timer count can be initiated or increased for other count durations.

Block 930 is followed by block 932, in which an indication is transmitted to a user. In this example, a controller such as 240 can provide an indication to a user. An example indication can be an alarm message stating that "Persistent dynamics at diffusion." In this instance, a user has to operate the gas turbine engine in diffusion mode, and the method 900 ends.

Referring back to decision block 926, if the intermediate threshold is not exceeded, then the "No" branch 934 is followed to block 936. In block 936, a controller can provide an indication to a user. In this example, an indication can be an alarm message stating, "Contact OEM for troubleshooting and Set Premix Lockout." In other embodiments, other indications can be implemented.

Block 936 is followed by branch block "B" 938, which is the same as branch block "B" 614 in FIG. 6 where the method 600 continues.

Referring back to decision block 904, if the intermediate threshold is not exceeded, then the "No" branch 940 is followed to block 942. In block 942, the median value can be compared to the lower or green logic threshold. In this embodiment, the controller 240 can confirm that the median value is within the lower threshold, such as 2 psi peak-to-peak.

Block 942 is followed by block 944, in which an indication is transmitted to a user and an engine control command can be implemented by the controller. In this example, the controller 240 can provide an indication to user. An example indication can be an alarm message stating that "Possible non-compliance of emissions." Furthermore, an engine control command can be transmitted by the controller 240 to adjust fuel splits between burners associated with the gas turbine engine back to an original setting. For instance, the fuel splits can be moved gradually back to the original PM1A fuel split by a predefined amount, such as approximately 3% per hour. In addition, the controller can determine whether the intermediate threshold is exceeded during the implementation of the control command, and initiate an additional engine control command if needed. For example, for each instance the intermediate threshold is exceeded, the PM1A fuel split can be increased by approximately 0.5% with a limit of nominal PM1A+3%. In other embodiments, the fuel split can be increased or decreased in other amounts, or other indications or engine control commands can be implemented by the controller.

In one embodiment, the controller such as 240 can initiate a timer count to determine the duration the PM1A fuel split is greater than a normal amount.

Block 944 is followed by decision block 946, in which a determination is made whether a median value for the operating frequency information is above an intermediate or yellow logic threshold. In this embodiment, a controller such as 240 can determine whether the median value for the operating frequency information associated with the cans of the gas turbine engine is above an intermediate threshold of approximately 4 psi peak-to-peak.

If the intermediate threshold is not exceeded, then the "No" branch 948 is followed to branch block "B" 950, which is the same as branch block "B" 614 in FIG. 6, and the method 600 begins.

Referring back to decision block 946, if the intermediate threshold is exceeded, then the "Yes" branch 952 is followed to block 954. In block 954, the controller 240 can increase a timer count for a predefined amount of time and check the upper threshold. In this example, the controller 240 can initiate or increase a timer for approximately 240 seconds. Furthermore, the median value for the operating frequency information is compared to determine whether the upper or red logic threshold is exceeded. In other embodiments, the timer count can be initiated or increased for other count durations.

Block 954 is followed by block 956, in which an indication is transmitted to a user. In this example, a controller such as 240 can provide an indication to a user. An example indication can be an alarm message stating that "Persistent dynamics at premix, split correction active and potential non-compliance with emissions." In this instance, the controller 240 maintains the gas turbine engine at the original PM1A fuel split+3%.

Block 956 is followed by branch block "B" 950, which is the same as branch block "B" 614 in FIG. 6, and the method 600 begins.

FIG. 10 illustrates the implementation of an embodiment of a combustion dynamics tuning process for a particular gas turbine engine. In FIG. 10, a series of example steady state-type operating frequency data 1000 is shown for an example gas turbine engine. Approximately 260 operating frequency data points 1000 are plotted along the x-axis 1002, and the peak-to-peak dynamic pressures (psi) of the data points are shown against the y-axis 1004. For each of the operating frequency data, a moving yellow threshold 1006 is also plotted. With reference to the data in this Figure, the yellow threshold 1006 is only exceeded in three instances 1008, 1010, 1012. In these instances, the active combustion dynamics tuning process implements an engine control command to reduce the operating frequency of the gas turbine engine. As shown in the remaining data, the operating frequencies remain below the moving yellow threshold 1006 throughout a majority of the data points shown.

Many modifications and other embodiments of the inventions set forth herein will come to mind to one skilled in the art to which these inventions pertain having the benefit of the teachings presented in the foregoing descriptions and the associated drawings. Thus, it will be appreciated by those of ordinary skill in the art that the invention may be embodied in many forms and should not be limited to the embodiments described above. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A system for controlling a gas turbine engine, the engine comprising multiple cans, the system comprising:
a plurality of sensors adapted to obtain operating frequency information associated with a respective can;
a controller adapted to:
during startup operation of the gas turbine engine:
determine whether the operating frequency information for a particular can exceeds at least one startup operating threshold for a predefined time; and
implement at least one engine startup control action to modify operation of the particular can when the at least one startup operating threshold is exceeded for the predefined time; and
during steady state operation of the gas turbine engine:
determine the variation between operating frequency information of at least two cans based at least in part on the operating frequency information;
determine a median value based at least in part on the variation;
determine whether the median value or the operating frequency information for a particular can exceeds at least one steady state operating threshold for another predefined time; and
implement at least one engine steady state control action to modify operation of either the gas turbine engine or the particular can when the at least one steady state operating threshold is exceeded for the other predefined time.

2. The system of claim 1, wherein operating frequency information comprises at least one of the following: operating amplitudes, or dynamic operating pressures.

3. The system of claim 1, wherein the the predefined times vary between about 60 seconds to about 1080 seconds.

4. The system of claim 1, wherein the at least one startup operating threshold and the at least one steady state operating threshold can comprise at least one of the following: a peak-to-peak dynamic amplitude value, an expected dynamic amplitude value, or a maximum dynamic amplitude value.

5. The system of claim 1, wherein the at least one engine startup control action and the at least one engine steady state control action can comprise at least one of the following: reduce load, control fuel splits, or trip the gas turbine engine.

6. The system of claim 1, wherein the at least one startup operating threshold and the at least one steady state operating threshold can comprise at least one of the following: a green threshold, a lower threshold, a yellow threshold, an intermediate threshold, an upper threshold, or a red threshold.

* * * * *